United States Patent
Scherzer et al.

(10) Patent No.: US 9,085,110 B2
(45) Date of Patent: Jul. 21, 2015

(54) PROCESS FOR PRODUCING FIBER-REINFORCED FLAT SEMIFINISHED PRODUCTS WITH A POLYAMIDE MATRIX

(75) Inventors: Dietrich Scherzer, Neustadt (DE); Stephan Schäfer, Griesheim (DE); Andreas Radtke, Mannheim (DE); Andreas Wollny, Ludwigshafen (DE); Max Ehleben, Braunschweig (DE); Olaf Täger, Braunschweig (DE); Jörg Hain, Gifhorn (DE); Manfred Kramer, Gifhorn (DE); Christoph Hermes, Gaimersheim (DE)

(73) Assignee: BASF SE, Ludwigshafen (DE)

( * ) Notice: Subject to any disclaimer, the term of this patent is extended or adjusted under 35 U.S.C. 154(b) by 395 days.

(21) Appl. No.: 13/409,904

(22) Filed: Mar. 1, 2012

(65) Prior Publication Data

US 2012/0222809 A1    Sep. 6, 2012

Related U.S. Application Data

(60) Provisional application No. 61/448,671, filed on Mar. 3, 2011.

(51) Int. Cl.
*B29C 70/50* (2006.01)
*B05D 3/12* (2006.01)
(Continued)

(52) U.S. Cl.
CPC . *B29C 70/50* (2013.01); *B05D 3/00* (2013.01); *B05D 3/02* (2013.01); *B05D 3/12* (2013.01);
(Continued)

(58) Field of Classification Search
CPC .... B32B 37/12; B32B 37/0038; B32B 37/02; B32B 37/14; B29B 15/10; B29B 15/122; B29B 15/125; B29C 70/50; B29C 70/52; B29C 70/523; B29C 70/521

USPC .......... 156/176, 177, 178, 180, 308.2, 309.6, 156/307.1, 307.7
See application file for complete search history.

(56) References Cited

U.S. PATENT DOCUMENTS 5,057,175 A * 10/1991 Ashton .................... 156/202
5,114,516 A *  5/1992 Pilling et al. ............. 156/180
(Continued)

FOREIGN PATENT DOCUMENTS

DE    195 10 237 A1    9/1996
DE    196 02 638 A1    8/1997
(Continued)

OTHER PUBLICATIONS

U.S. Appl. No. 13/454,320, filed Apr. 24, 2012, Desbois, et al.
U.S. Appl. No. 13/409,904, Mar. 1, 2012, Scherzer, et al.
International Preliminary Report on Patentability and International Search Report issued Jun. 21, 2012, in PCT/EP2012/053246 (with English-language translation of the International Search Report).

Primary Examiner — John Goff
(74) *Attorney, Agent, or Firm* — Oblon, McClelland, Maier & Neustadt, L.L.P.

(57) ABSTRACT

The invention relates to a process for producing fiber-reinforced flat semifinished products based on a polyamide matrix, comprising the following steps:
(a) saturation of textile structures with a mixture comprising molten lactam, catalyst, and optionally activator,
(b) cooling of the saturated textile structures, and
(c) finishing of the cooled textile structures to give the fiber-reinforced flat semifinished product.

The invention further relates to a process for producing a component made of the fiber-reinforced flat semifinished product.

19 Claims, 1 Drawing Sheet

(51) Int. Cl.
*B05D 7/00* (2006.01)
*B05D 3/00* (2006.01)
*B05D 3/02* (2006.01)
*B32B 37/02* (2006.01)
*B32B 37/12* (2006.01)
*B32B 37/14* (2006.01)
*B29B 15/12* (2006.01)
*B29C 67/24* (2006.01)
*B29K 77/00* (2006.01)

(52) U.S. Cl.
CPC ............... *B05D 7/00* (2013.01); *B29B 15/122* (2013.01); *B29C 67/246* (2013.01); *B29C 70/504* (2013.01); *B32B 37/02* (2013.01); *B32B 37/12* (2013.01); *B32B 37/14* (2013.01); *B29K 2077/00* (2013.01); *Y10T 156/10* (2015.01)

(56) References Cited

U.S. PATENT DOCUMENTS

| | | | |
|---|---|---|---|
| 5,264,060 A * | 11/1993 | Lambing et al. | 156/180 |
| 6,585,842 B1 * | 7/2003 | Bompard et al. | 156/166 |
| 2005/0214465 A1 | 9/2005 | Maskus et al. | |
| 2009/0081448 A1 | 3/2009 | Jambois et al. | |
| 2010/0075144 A1 | 3/2010 | Davies | |
| 2010/0305269 A1 * | 12/2010 | Gleich et al. | 524/606 |

FOREIGN PATENT DOCUMENTS

| | | |
|---|---|---|
| DE | 10 2007 031 467 A1 | 1/2009 |
| WO | WO 03/053661 A1 | 7/2003 |
| WO | WO 2011/003900 A2 | 1/2011 |

* cited by examiner

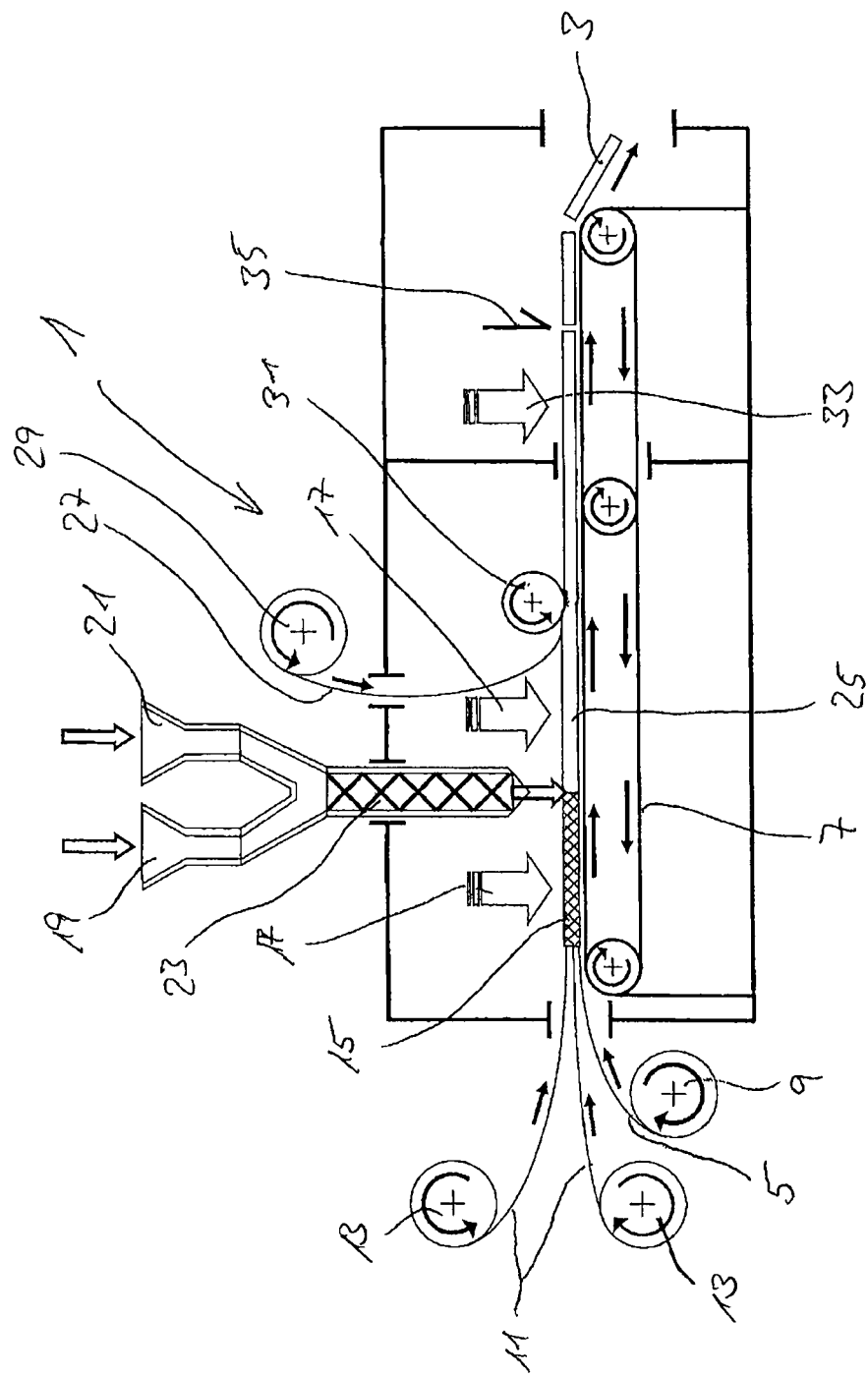

PROCESS FOR PRODUCING FIBER-REINFORCED FLAT SEMIFINISHED PRODUCTS WITH A POLYAMIDE MATRIX

The invention relates to a process for producing fiber-reinforced flat semifinished products with a polyamide matrix.

The fiber-reinforced flat semifinished products are used for producing components made of reinforced thermoplastic polymers, preferably polyamides, and after the hardening process they are also termed organopanel or thermoplastic prepreg. The shaping process used here is thermoforming or other press processes.

The fiber-reinforced composite materials are usually produced by inserting the fibers into a suitable mold and then using the molten polymers for encapsulation. In another possible method, a monomer solution is used to encapsulate the fibers, and polymerizes to completion within the mold. However, a disadvantage here, in particular in the case of dense fiber packing, is that the high viscosity of the polymer melts leads to incomplete wetting of the fibers, and this weakens the material. Monomers are usually used for encapsulation in the case of thermoset polymers, but this has the disadvantage that continuous processing is not possible since each of the components produced from the fiber-reinforced composite material has to harden in the mold. Once the encapsulation process and hardening process has been completed, the shaping process has already taken place. Semifinished products capable of further processing cannot easily be produced by this method. There are known prepregs based on partially hardened epoxy resins, but these have to be stored under cooled conditions in order to avoid undesired hardening during storage. The hardening process within the mold also limits the possible throughput, and this is disadvantageous in particular for mass production of components.

The wetting of the fibers with a monomer for a fiber-reinforced thermoplastic polymer is known from DE-A 196 02 638. Here, a reinforcement fiber structure, for example a woven or individual plies made of continuous fibers, is saturated with a melt made of lactam which comprises activator, catalyst, and optionally further additives. After saturation with the lactam melt, the material is heated to reaction temperature and the lactam is polymerized to give the corresponding polyamide. In order to avoid dripping of the molten lactam out of the reinforcement fiber structure, it is necessary to carry out the polymerization step immediately after the saturation process. This has the disadvantage that the processing rate is limited by the polymerization step. Production of a relatively large number of parts always requires provision of systems in which the reinforcement fiber structures are first saturated with the lactam melt and these are then molded to give the molding. DE-A 196 02 638 further discloses that, for production of moldings from flat fiber-reinforced elements, the flat fiber-reinforced elements are first produced via saturation of textile structures with lactam; this is followed by completion of the polymerization process and the resultant completely polymerized fiber-reinforced elements are then subjected to forming in a heated mold to give the molding.

DE-A 10 2007 031 467 also discloses a process in which fibers used for reinforcement are saturated with a melt made of lactam and, in a step that follows immediately, the lactam is polymerized completely to give the polyamide. In the process described in that document, a granulated material reinforced only with short fibers is produced and can then be processed by injection molding or extrusion. This does not permit production of organopanels which comprise continuous fibers as reinforcement.

WO-A 2011/003900 describes another process for producing fiber-reinforced composite materials made of nylon-6 and of copolyamides of nylon-6 and nylon-12. Here again, the polymerization of the monomers used takes place immediately after the saturation of the fibers, and there is therefore no possible rational use of the process for mass production of components made of organopanels.

It is an object of the present invention to provide a process which can produce fiber-reinforced flat semifinished products and which can be operated continuously and can give throughput sufficient for mass production.

The object is achieved via a process for producing fiber-reinforced flat semifinished products, comprising the following steps:

(a) saturation of textile structures with a mixture comprising molten lactam, catalyst, and optionally at least one activator, (b) cooling of the saturated textile structures, and (c) finishing of the cooled, saturated textile structures to give a flat semifinished product.

Saturation of the textile structures and then cooling below the melting point of the lactam permits continuous operation of the process. Furthermore, there is no need to pass the resultant flat semifinished products on to a polymerization process immediately, and the production of the semifinished products and the manufacture of the components to be produced from the semifinished product can therefore take place independently of one another.

The temperature of the molten lactam is preferably in the range from 70 to 100° C. It is important that the temperature of the molten lactam is kept below the initiation temperature at which the lactam begins to polymerize to give the polyamide.

For the purposes of this invention, laurolactam or caprolactam can be used as lactam. Preferred lactam is caprolactam, in particular ε-caprolactam, which polymerizes to give nylon-6.

Up to 20% by weight, preferably from 0 to 17% by weight, particularly preferably from 0 to 15% by weight, of the caprolactam can be replaced by comonomers from the group of the lactams having at least 4 carbon atoms. ω-Laurolactam is particularly preferred.

In one preferred embodiment, mixtures made of ε-caprolactam and ω-laurolactam can be used. The mixing ratio is generally 1000:1, preferably 100:1, particularly preferably 10:1, in particular 2:1.

The molten lactam can comprise activators for nylon-6. Suitable activators can by way of example be produced via reaction of isocyanates, such as hexamethylene diisocyanate (HDI) with lactams, such as ε-caprolactam. Other suitable activators are capped isocyanates, isophthaloylbiscaprolactam, terephthaloylbiscaprolactam, esters, such as dimethyl phthalate-polyethylene glycol, polyols or polydienes in combination with acyl chlorides, carbonylbiscaprolactam, hexamethylene diisocyanate, or acyl lactamate, preferably isocyanates, hexamethylene diisocyanate, or acyl lactamate, particularly preferably hexamethylene diisocyanate or acyl lactamate.

Activators that can be used are any of the activators which are used for the activated anionic polymerization process, examples being N-acyllactams, such as N-acetylcaprolactam, substituted triazines, carbodiimides, cyanamides, mono- and polyisocyanates, and the corresponding masked isocyanate compounds. The concentrations used of the activators are preferably from 0.1 to 1 mol %, based on the amount of lactam. With the catalysts used it is possible to polymerize lactams having at least 5 ring members, e.g. caprolactam, laurolactam, caprylolactam, enantholactam, the corresponding C-substituted lactams, or a mixture of the lactams mentioned.

As an alternative to, or in addition to, the admixture of the activator with the lactam, it is also possible to begin by coating the fibers of the textile structure with the activator and then to saturate the activator-coated textile structure with the lactam. By way of example, it is possible here to admix the activator with a size for treating the fibers.

Suitable alkaline catalysts can be produced via reaction of a lactam or a lactone with the corresponding alkali metal compound or alkaline earth metal compound, for example the alcoholate, amide, hydride, Grignard compounds, or else with the alkali metals or alkaline earth metals. The amounts added of the catalysts are generally from 0.1 to 40% by weight, preferably from 0.2 to 15% by weight, based on the lactam melt.

Catalysts with good suitability for the polymerization process are alkaline catalysts, such as magnesium halogen lactamates, alkali metal caprolactamates, aluminum lactam or magnesium lactam, sodium caprolactamate, or magnesium bromide lactamate, preferably alkali metal caprolactamate, aluminum lactam or magnesium lactam, sodium caprolactamate, or magnesium bromide lactamate, particularly preferably sodium caprolactam or magnesium bromide lactamate. Sodium caprolactamate is particularly suitable and can be produced easily from sodium and $\epsilon$-caprolactam.

The mixing ratio of lactam, preferably caprolactam, activator, and alkaline catalyst can vary widely. The molar ratio of caprolactam to activator to alkaline catalyst is generally from 1000:1:1 to 1000:200:50.

The lactam can also comprise other additives alongside the catalyst and the activator. The other additives are added in order to adjust the properties of the polyamide produced from the lactam. Examples of conventional additives are plasticizers, impact modifiers, crosslinking agents, dyes, or flame retardants.

For the purposes of the present invention a textile structure means wovens made of at least one ply, preferably of more than one ply, knits made of one or more plies, braids made of one or more plies, laid scrims, at least one ply, preferably a plurality of plies, made of parallel-oriented fibers, yarns, threads, or cordage, where the individual plies of the parallel-oriented fibers, yarns, threads, or cordage can be mutually nonparallel, or nonwovens. It is preferable that the textile structures take the form of wovens or of plies of parallel-oriented fibers, yarns, threads, or cordage.

If in the case of laid scrims the plies of parallel-oriented fibers, yarns, threads, or cordage are used in mutually nonparallel form, it is particularly preferable that the angle of rotation between the individual plies is respectively 90° (bidirectional structure). If the number of plies used is three or a multiple of three, it is also possible to arrange the angle of rotation between the individual plies to be 60°, and if the number of plies is four or a multiple of four it is also possible to arrange the angle of rotation between the individual plies to be 45°. It is moreover also possible to provide more than one ply of fibers with identical orientation. It is also possible here that plies are mutually nonparallel, where the number of plies with fibers of identical orientation in each of the orientations of the fibers can differ, an example being four plies in one first direction and one ply in a direction where the angle of rotation between these directions is, for example, 90° (bidirectional structure with preferential direction). There is also a known quasi-isotropic structure in which the arrangement has the fibers of a second ply at an angle of rotation of 90° between these and fibers of a first ply, and moreover has fibers of a third ply with an angle of rotation of 45° between these and the fibers of the second ply.

It is particularly preferable to use, for production of the fiber-reinforced flat semifinished products, textile structures in from 2 to 10 plies, in particular in from 2 to 6 plies.

The textile structures used preferably comprise, as fibers, fibers made of inorganic minerals, such as carbon, for example in the form of low-modulus carbon fibers or high-modulus carbon fibers, silicatic and non-silicatic glasses of a very wide variety of types, boron, silicon carbide, potassium titanate, metals, metal alloys, metal oxides, metal nitrides, metal carbides, and silicates, and also organic materials, such as natural and synthetic polymers, e.g. polyacrylonitriles, polyesters, ultrahigh-draw polyolefin fibers, polyamides, polyimides, aramids, liquid-crystal polymers, polyphenylene sulfides, polyether ketones, polyether ether ketones, polyetherimides, cotton, cellulose, and other natural fibers, such as flax, sisal, kenaf, hemp, and abaca. Preference is given to high-melting-point materials, such as glasses, carbon, aramids, potassium titanate, liquid-crystal polymers, polyphenylene sulfides, polyether ketones, polyether ether ketones and polyetherimides, and particular preference is given to glass fibers, carbon fibers, aramid fibers, steel fibers, potassium titanate fibers, ceramic fibers, and/or other sufficiently heat-resistant polymeric fibers or filaments.

In order that the textile structures can be saturated uniformly, they are preferably laid continuously on a conveyor belt and passed through saturation equipment. An example of suitable saturation equipment is a bath through which the textile structures are passed. Another possible alternative is that the textile structures are coated or saturated by spray-application, sprinkler-application, or die-coating processes, preferably with use of a slot die, or by means of rotating cylinders, or via doctor systems. Particular preference is given to spray-application or die-coating onto the textile structures or onto a portion of the textile structures using stoichiometric amounts of lactam or lactams which already comprise the additives needed for the polymerization process. Unlike in the saturation processes described, there is therefore no need for pressing to expel excess lactam. Commercially available low-pressure two-component die-coating machinery such as that marketed by Tartler, Michelstadt is suitable for the spray-application or die-coating process. It is particularly preferable to use a slot die for the saturation or coating of the fibers.

In one preferred embodiment, the textile structures are applied to a foil, preferably a polyamide foil, prior to the saturation process. The foil has a favorable effect on the surface of the fiber-reinforced flat semifinished product produced. The use of the foil can therefore give high-quality surfaces which by way of example can be used as visible surface. It is moreover also possible to utilize the foil as conveyor belt.

In order to obtain uniform wetting of the fibers of the textile structure and thus avoid defects, preference is further given to heating the textile structures to a temperature above the melting point of the lactam, prior to the saturation process. This has the advantage of avoiding crystallization of lactam out of the material on contact with the fibers; this can sometimes block pathways through which the lactam flows during the saturation process, with possible resultant cavities in the fiber-reinforced flat semifinished product.

In one preferred embodiment, a foil, preferably a polyamide foil, is applied to the saturated textile structures, after the saturation of the textile structures with lactam. This also gives a high-quality surface which can be used as visible surface. It is particularly preferable that the foil is applied to the saturated textile structures if the textile structures have been placed onto a foil prior to the saturation process. The fiber-reinforced flat semifinished product therefore has a polyamide foil applied not only on the lower side but also on the upper side, and the fiber-reinforced flat semifinished product therefore has, not only on the lower side but also on the upper side, a high-quality surface which can be used as visible surface.

In order to obtain uniform distribution of the molten lactam within the textile structures, the textile structures are preferably pressed, after the saturation process. During the pressing process it is also possible to expel excess lactam from the textile structures, thus achieving uniform and complete saturation with lactam.

In order to permit continuous manufacture of the fiber-reinforced flat semifinished product, the saturated textile structures are preferably passed through between rolls for the pressing process. In an alternative possibility, the textile structures can also be pressed with a single roll against the conveyor belt used, if the conveyor belt does not yield under the pressure.

The saturated textile structures are cooled in order to permit drying of the same. If the saturated textile structures are pressed, the cooling takes place after the pressing process. The cooling solidifies the lactam used, and the textile structures therefore comprise the lactam in solid condition, after the drying process.

In one preferred embodiment, after the saturation process and prior to the pressing process for the textile structures, in each case at least one fiber ply is applied, for example in the form of a knit, woven, laid scrim, or nonwoven, to the upper side and to the lower side of the saturated textile structures. By virtue of the pressing process, the lactam comprised within the textile structures is also introduced into the fiber plies applied after the saturation process. The amount of excess lactam is reduced by the textile structures applied after the saturation process, because these absorb lactam during the pressing process and become saturated with the lactam.

After pressing and cooling, which solidifies the lactam, the semifinished product is subjected to finishing. To this end, the fiber-reinforced flat semifinished product produced in the form of continuous strip is cut to size.

In addition to, or as an alternative to, the application of the foil, preferably the polyamide foil, on the upper side and the lower side of the saturated textile structures, it is possible to weld the finished fiber-reinforced flat semifinished product into foils. This firstly permits protection of the resultant finished, fiber-reinforced flat semifinished product, and secondly can give a further improvement in the surface.

A further advantage of the application of the foil on the upper side and the lower side of the saturated textile structures is that water, which deactivates the catalyst, cannot diffuse into the saturated textile structure. Welding into foil further amplifies this effect, and it also moreover seals the edges of the saturated textile structures, thus also preventing ingress of the water here. The result is an improvement in the shelf life of the semifinished product.

The foil into which the semifinished product is welded can be any desired foil which is impermeable to water. It is preferable to use polyamide foils or polyester foils. If foils made of a material other than polyamide or polyester are used, it is generally necessary to remove the semifinished product from the foil prior to further processing. If a polyamide foil is used, and also sometimes if a polyester foil is used, the semifinished product can be further processed together with the foil and does not have to be removed. This can give easier handling of the semifinished products, and this is particularly desirable when they are used for large-scale industrial purposes.

Because the catalyst is water-sensitive it is necessary that the production and further processing of the semifinished product takes place with exclusion of water, i.e. in dry air or in an anhydrous inert gas. To the extent that the semifinished product has not been welded within a foil or at least has been covered by a foil on the upper side and lower side, further processing is required within a period of 5 minutes in order to avoid undesired water absorption which deactivates the catalyst and then prevents complete polymerization of the lactam.

The invention provides not only the process for producing a fiber-reinforced flat semifinished product but also a process for producing a component made of the flat fiber-reinforced semifinished product.

The process for producing a component made of a fiber-reinforced flat semifinished product comprises the following steps:

(i) production of the fiber-reinforced flat semifinished product as described above, (ii) insertion of the fiber-reinforced flat semifinished product into a mold, and (iii) subjecting the fiber-reinforced flat semifinished product to a molding process to give the component with simultaneous heating of the mold, so that the lactam polymerizes to give polyamide.

Production of the finished, fiber-reinforced flat semifinished product permits separation of the production of the component from the production of the semifinished product. It is therefore possible to produce the semifinished product in a continuous process and, after the production process, keep it available for producing the component. This permits use in mass production, where production of the semifinished product is independent of production of the component. By way of example, therefore, it is possible to use one apparatus to produce semifinished products and to use a plurality of apparatuses to mold the resultant semifinished products to give components. There is no need for an allocated unit for production of the semifinished products for every apparatus for producing components, and it is thus possible to save not only capital expenditure but also operating costs.

For the production process, the fiber-reinforced flat semifinished product produced by the process described above is inserted into a mold in which the fiber-reinforced flat semifinished product is molded to give the component. An example of a suitable forming process is a thermoforming process or a press process.

The molding in which the semifinished product is molded to give the component is heated in the invention to a temperature at which the lactam polymerizes anionically to give the polyamide. The temperature of the mold here is preferably in the range from 100 to 200° C., more preferably in the range from 120 to 180° C., and in particular in the range from 140 to 170° C. The catalyst comprised within the lactam catalyzes the anionic polymerization reaction, and the resultant polyamide still comprises the catalyst after the polymerization reaction.

The FIGURE depicts one embodiment of the invention, and this is explained in more detail in the description below.

The single FIGURE is a diagram of the process of the invention for producing a fiber-reinforced flat semifinished product.

A first foil 5 is introduced into an apparatus 1 for producing fiber-reinforced flat semifinished products 3. The first foil 5 is applied to a conveyor belt 7. A suitable conveyor belt 7 is simply any desired conveyor belt which is capable of transporting the foil 5 and which is known to the person skilled in the art. The surface of the conveyor belt 7 has been designed here in such a way that the foil 5 is not damaged by the movement of the conveyor belt 7 or on application to the conveyor belt 7. In order that the process can be operated continuously, the foil 5 has been provided on a roller 9 from which the foil is unwound and introduced into the apparatus 1.

In the embodiment depicted here, two plies of fibers 11 are laid on the foil 5. The fibers 11 here can take the form of woven, knit, laid scrim, or nonwoven, or can take the form of parallel-oriented fibers, yarns, threads, or cordage. If parallel-oriented fibers are used, it is preferable to orient the fibers of the individual plies so as to be mutually nonparallel, preferably with an angle of rotation of 90° between these. The addition of the fibers 11 also takes place continuously, and the fibers 11 here have been provided on a roller 13. The fibers 11 laid on the foil 5 form the textile structure 15 to be saturated.

In order to obtain uniform wetting of the fibers of the textile structure 15 with lactam, it is preferable to heat the textile structure. Arrows 17 in the FIGURE depict the heat supply. After heating, the textile structure 15 is saturated with molten lactam. The molten lactam comprises at least one catalyst which catalyzes the anionic polymerization reaction to give polyamide, and also optionally comprises at least one activator. The material can also additionally comprise further additives which can influence the properties of a polyamide produced from the lactam. The temperature to which the textile structure 15 is heated is preferably the melting temperature of the lactam used. It is preferable that the temperature is in the range from 70 to 90° C. During the heating process, care has to be taken that the temperature of the molten lactam and the temperature to which the textile structure 15 is heated are kept below the initiation temperature for the anionic polymerization of the lactam.

In the embodiment depicted here, molten lactam with activator is added by way of a first feed 19 and molten lactam with catalyst is added by way of a second feed 21, to a mixing unit 23. The mixing unit can by way of example have been designed in the form of extruder or else in the form of static mixer. A homogeneous mixture of the lactam with activator and catalyst is produced in the mixing unit. The molten lactam comprising activator and comprising catalyst is applied to the textile structure 15. Any desired apparatus known to the person skilled in the art can be used here for saturating the textile structures 15. By way of example, it is therefore possible to use curtain coating or other die-coating processes to saturate the textile structures with the molten lactam. In an alternative possibility, the lactam can be applied by spraying onto the textile structures 15. It is moreover also possible to pass the textile structures through a bath with molten lactam, or to saturate them by using wetted rolls. It is preferable here to use spray-application processes to saturate the textile structures.

In the embodiment depicted here, a second foil 27 is applied to the saturated textile structure 25, after the saturation process. It is preferable here that the second foil 27, like the first foil 5, is unwound from a roller 29 on which it has been provided.

In a step that follows, the saturated textile structure 25 is pressed. To this end, the saturated textile structure 25 is by way of example forced by a roll 31 against the conveyor belt 7. In an alternative possibility, the saturated textile structure 25 is by way of example passed through between two contrarotating rolls, where the distance between the contrarotating rolls is smaller than the thickness of the saturated textile structure 25 prior to passage through the rolls. The distance between the rolls, or the distance of the roll 31 from the conveyor belt 7, is used to adjust the force with which the saturated textile structure 25 is pressed.

In an embodiment not depicted here, at least one further fiber ply is applied on the upper side and/or the lower side of the saturated textile structure, after the saturation process. The fibers applied additionally here are preferably of the same type as the fibers 11 which form the textile structure 15. However, in an alternative possibility, the fibers which form the textile structure 15 are, for example, individual plies of parallel-oriented fibers, yarns, threads, or cordage, or a nonwoven forms the textile structure 15 and the additional plies are wovens or knits.

The pressing of the saturated textile structure 25 forces lactam into the additionally applied fiber plies, and the additionally applied fiber plies are thus also saturated with lactam.

The saturated textile structure 25 is cooled after the pressing process. An arrow 33 depicts this. The cooling process solidifies the lactam, and a textile structure comprising solid lactam is produced. This is finished by using a cutter 35, for example a blade, a punch, or a saw, to give the fiber-reinforced flat semifinished product 3.

For production of components, the fiber-reinforced flat semifinished product is inserted into a mold which has been heated to a temperature at which the lactam undergoes complete anionic polymerization to give the polyamide. The heating to a temperature above the initiation temperature for the anionic polymerization reaction polymerizes the lactam with which the textile structures have been saturated, to give the corresponding polyamide. By virtue of the simultaneous pressing process, the fiber-reinforced flat semifinished product is converted to the desired shape of the component to be produced.

Examples of components which can be produced in this way are parts of vehicle body work, structural components for vehicles, for example floors or roofs, and constituent components for vehicles, e.g. assembly supports, seat structures, door cladding or interior cladding, and also components for wind power systems or rail vehicles.

KEY

1 Apparatus for producing fiber-reinforced flat semifinished products
3 Fiber-reinforced flat semifinished product
5 Polyamide foil
7 Conveyor belt
9 Roller with polyamide foil
11 Fiber
13 Roller providing fiber
15 Textile structure
17 Heat supply
19 First feed
21 Second feed
23 Mixing unit
25 Saturated textile structure
27 Second polyamide foil
29 Roller with second polyamide foil
31 Roll
33 Cooling
35 Cutter

The invention claimed is:

1. A process for producing a fiber-reinforced flat semifinished product, comprising the following, in order:
    (a) saturation of a textile structure with a mixture comprising molten lactam, catalyst, and optionally activator, at a temperature below an initiation temperature at which the lactam begins to polymerize to give a polyamide, thereby obtaining a saturated textile structure, (b) cooling of the saturated textile structure, thereby obtaining a cooled textile structure, and (c) finishing of the cooled textile structure at a temperature below an initiation temperature at which the lactam begins to polymerize to give a polyamide, to give the fiber-reinforced flat semifinished product, wherein the textile structure is heated to a temperature above the melting point of the lactam, prior to the saturation process, and wherein the textile structure is applied to a first foil, which is impermeable to water, prior to the saturation process.

2. The process according to claim 1, wherein a second foil, which is impermeable to water, is applied to the saturated textile structure, after the saturation process (a).

3. The process according to claim 1, wherein the first foil is a polyamide foil.

4. The process according to claim 2, wherein the second foil is a polyamide foil.

5. The process according to claim 1, wherein the saturated textile structure is pressed.

6. The process according to claim 5, wherein the saturated textile structure is passed between rolls for the pressing process.

7. The process according to claim 5, wherein the saturated textile structure is cooled after the pressing process.

8. The process according to claim 5, wherein, after the saturation process and prior to the pressing process, in each case at least one fiber ply is applied to the upper side and the lower side of the saturated textile structure.

9. The process according to claim 1, wherein the textile structure is a woven, a knit, a laid scrim, or a nonwoven made of continuous fibers.

10. The process according to claim 1, wherein the textile structure has been manufactured from individual plies made of continuous fibers, where the individual plies comprise parallel-arranged fibers, and the fibers of mutually superposed plies have been arranged so as to be mutually nonparallel.

11. The process according to claim 10, wherein material used for the fibers comprises an inorganic mineral or an organic material.

12. The process according to claim 1, wherein the textile structure comprises from three to ten plies of fibers.

13. The process according to claim 1, wherein the fiber-reinforced flat semifinished product is welded into a foil after the finishing process.

14. The process according to claim 13, wherein the foil into which the fiber-reinforced flat semifinished product is welded is a polyamide foil or a polyester foil.

15. The process according to claim 1, wherein the fibers of the textile structure are first coated with an activator.

16. A process for producing a component made of a flat semifinished product reinforced by continuous fiber, comprising the following, in order:

(i) production of the semifinished product according to claim 1, (ii) insertion of the semifinished product into a mold, and (iii) pressing of the semifinished product to give the component and heating of the mold, so that the lactam polymerizes to give polyamide and the component is thus molded.

17. The process according to claim 16, wherein the mold is heated to a temperature in the range from 100 to 190° C.

18. The process according to claim 11, wherein the material is an inorganic mineral which comprises carbon, a silicatic or nonsilicatic glass, boron, silicon carbide, potassium titanate, a metal, a metal alloy, a metal oxide, a metal nitride, a metal carbide, or a silicate.

19. The process according to claim 11, wherein the material is an organic material which comprises a natural or synthetic polymer.

* * * * *